3,384,644
AMINOPHENOXYMETHYLATED
PHTHALOCYANINES
Harlan B. Freyermuth and David I. Randall, Easton, Pa.,
assignors to General Aniline & Film Corporation, New
York, N.Y., a corporation of Delaware
No Drawing. Filed Dec. 28, 1965, Ser. No. 517,129
10 Claims. (Cl. 260—314.5)

ABSTRACT OF THE DISCLOSURE

Novel phthalocyanine dyestuff compounds containing at least one acylamino or aminophenoxymethylene group, and novel methods of making same.

---

This invention is concerned with the provision of novel phthalocyanine compounds, and more particularly to the provision of novel substituted phthalocyanine compounds useful as dyestuffs and as intermediates for the production of azo dyestuffs, fiber-reactive dyestuffs and the like.

Dyestuffs containing a phthalocyanine residue, and the numerous advantages of such dyestuffs attributable to the presence of such residue, are well known. It is an object of the present invention to provide a phthalocyanine compound containing a novel substituent whereby the substituted compound is useful as a dyestuff per se and/or as an intermediate readily useful for synthesizing azo dyestuffs, dyestuffs containing any one of the many known fiber-reactive and/or chromophoric groups and the like. Other objects and advantages will appear as the description proceeds.

The attainment of the above objects is made possible by the present invention which is based upon the provision of a compound of the following formula and novel methods for producing same:

I 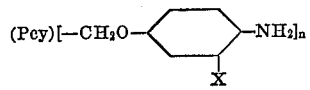

wherein Pcy represents a dyestuff moiety of the phthalocyanine series, X represents —H, —SO₃H or

R¹ and R² represent H, aryl or lower alkyl or, together with the N atom, the atoms necessary to complete a 5 or 6 membered heterocyclic, and $n$ has an average value of 1 to 4.

As employed in the above formula and hereinafter, the terms Pcy, phthalocyanine dyestuff and/or dyestuff of the phthalocyanine series are inclusive of unmetallized phthalocyanine molecules, and metallized phthalocyanine molecules such as the preferred copper, in addition to cobalt, aluminum, nickel, iron, zinc, vanadium, tin, magnesium, chromium, and other metal phthalocyanines. Whether metallized or unmetallized, such phthalocyanine molecule may be nuclearly substituted by one or more lower alkyl such as methyl or ethyl, halogen such as chlorine or bromine, phenyl, or water solubilizing groups such as sulfonic or carboxylic acid, sulfonamide, or the like.

In the above structural Formula I, the bracketed portion is nuclearly bonded to the fundamental phthalocyanine nucleus, and one or more of the four benzene rings in such nucleus may be substituted by the bracketed group.

In the above Formula I, X represents H, SO₃H (including as equivalents its alkali metal, metal, alkaline earth metal, ammonium, and organic amine salts), or any of the following illustrative sulfonamido groups:

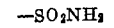
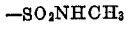
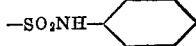
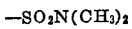
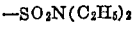
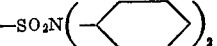
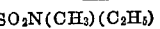
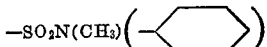
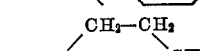
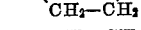
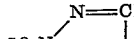
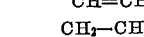

It will be understood that without departing from the spirit and scope of the present invention, there may be provided compounds equivalent to Formula I above wherein the bracketed benzene ring may be substituted in any of the vacant positions by lower alkyl such as methyl or ethyl, lower alkoxy, such as methoxy, or ethoxy, phenyl, or phenoxy, and that R¹ or R² values other than H may be substituted by similar lower alkyl, lower alkoxy, phenyl or phenoxy groups or by hydroxy, sulfonic, or carboxylic or the like.

In accordance with the present invention, compounds of the above Formula I wherein X is H may be prepared by reacting by heating at a temperature of about 60 to 100° C. and preferably about 80 to 90° C., a compound of the phthalocyanine series containing an average of 1 to 4 nuclearly substituted chloromethyl groups per molecule with, for each mole of said compound, 1 to 4 moles of a p-hydroxyacylanilide of the formula II 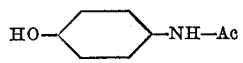

and then subjecting the resulting intermediate to the action of an acidic medium to hydrolyze the acylamino group to —NH₂. The acylanilide may be nuclearly substituted by any inert group which does not interfere with the reactivity of the OH in intermediate II, as for example any of the lower alkyl, lower alkoxy, phenyl or phenoxy groups referred to above, and the acyl radical Ac therein may be any readily hydrolyzable group, preferably a lower alkanoyl group as derived for example from formic, acetic, propionic or butyric or the like. When the phthalocyanine reactant contains more than one chloromethyl group, all or part of the additional chloromethyl groups may be converted to compounds of Formula I above by employing in the described reaction correspondingly increased molecular proportions of the acylanilide reactant. The acidic hydrolysis step may be carried out in any known manner as for example at elevated temperatures or under reflux in an aqueous solution of a mineral acid such as hydrochloric acid, sulfuric acid or the like.

Products with increased water solubility may be prepared by employing as the initial phthalocyanine reactant in the above described reaction a chloromethylated and sulfonated phthalocyanine, or by employing as the acidic hydrolyzing medium a sulfonating agent such as sulfuric acid of at least 96% concentration, including oleum preferably at elevated temperatures over about 30° C. This latter sulfonating reaction simultaneously hydrolyzes the acylamino group to —NH$_2$ and results in a sulfonated product of the Formula B in Equation V below.

Products of the above Formula I wherein X is —SO$_2$NR$^1$R$^2$ may be prepared from the acylamino-containing intermediate of Formula A in Equation III below by chlorosulfonation in known manner with chlorosulfonic acid to yield a compound of Formula C in Equation VI below and then reacting the resulting chlorosulfonated compound with ammonia or a primary or secondary amine of the formula HNR$^1$R$^2$ as for example mono- or di- methyl-, -ethyl-, or -phenyl-amine, methylethylamine, methylphenylamine, piperidine, piperazine, pyrazole, morpholine, pyrrole, and 2-pyrrolidone.

The above described reactions may be illustrated by the following Equations III–VII employing acetyl, —COCH$_3$, as the acyl radical Ac, and ammonia as the compound of formula HNR$^1$R$^2$.

stuffs are substantive to cellulosic, wool, silk, and synthetic fibers such as polyacrylonitrile yielding bright green or blue-green dyeings.

Additionally, the products of the present invention may be reacted with halo-containing anthraquinones such as for example bromamine acid to yield desirable anthraquinone dyestuffs. Further, the present products may be reacted with cyanuric acid and primary amino condensation products of cyanuric acid to yield fiber-reactive triazinylamino-containing dyestuffs, with acryloyl chloride to yield fiber-reactive acrylamide-containing dyestuffs, with monochloro- or polychloro-acryloyl chlorides to yield fiber-reactive chloroacrylamide-containing dyestuffs, and other known halo-containing polyfunctional compounds for the production of other fiber-reactive dyestuffs.

The following examples are only illustrative of the present invention and are not to be regarded as limitative. All parts and proportions referred to herein and in the appended claims are by weight unless otherwise indicated.

Example 1

(a) In a 600 ml. beaker equipped with a stirrer and thermometer are placed 18.5 g. (0.025 mole) of trischloromethyl copper phthalocyanine, 11.3 g. 4-hydroxyacetanilide (0.075 mole) and 250 ml. N-methylpyrrolidinone. With continual stirring the mixture is heated on a steam bath to 60° C. and 8.1 g. sodium pyrrolidinone are added portionwise during 15 minutes. An additional 50 ml. N-methylpyrrolidinone are added to wash down the sides of the beaker and the temperature is raised to 85– 90° C. and maintained with stirring for 6 hours. The hot reaction

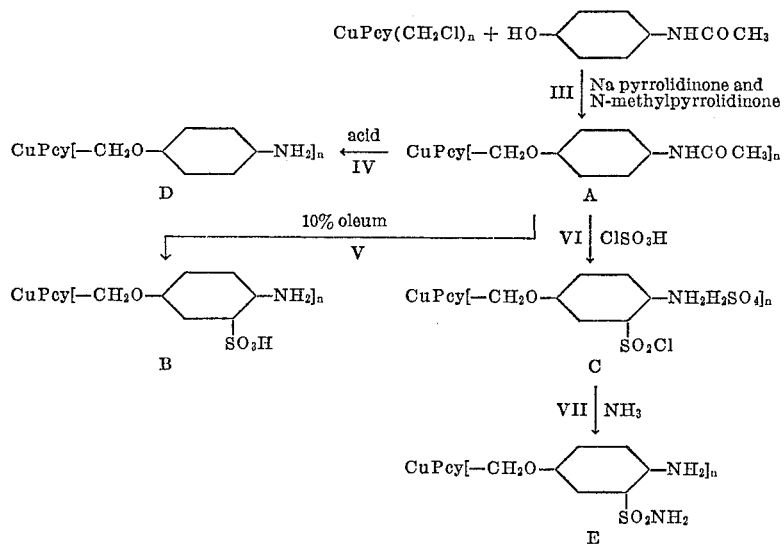

In the first reaction illustrated by Equation III above, the sodium pyrrolidinone is employed in a molar amount at least equivalent to the hydroxyacylanilide, for example in molar proportions of 1–3:1. The N-methylpyrrolidinone is employed as the reaction medium in readily ascertainable proportions required for solubilizing and fluidizing the reaction mixture. Without limiting the invention thereto, it is postulated that the sodium pyrrolidinone serves as a transfer agent to form the sodium phenolate (of the p-hydroxyacylanilide) which in turn condenses with the chloromethyl groups in the phthalocyanine compound.

The compounds of the present invention are per se green or blue-green (turquoise) dyestuffs which may be further employed as in the production of other types of dyestuffs. Thus, they may be diazotized and coupled in known manner with any of the known types of coupling components such as pyrazolones, e.g. 1-phenyl-3-methyl-pyrazolone-5; acylacetanilides, e.g. aceto-acet-anilide; and aromatic hydroxy compounds, e.g. H-, J-, K-, and R-acids, 2-hydroxy-3-naphthoic acid and its anilide derivatives, resorcinol, naphthol, and the like. Such azo dyemixture is drowned into one liter of water and filtered on a Buchner funnel. The cake is washed with two liters of hot (80–90° C.) water and dried in a vacuum oven at 75° C. The resulting tris(4-acetylaminophenoxymethyl) copper phthalocyanine of Formula A in Equation III above weighs 21.6 g.

(b) 21 g. of the product from (a) are gradually added to 186 g. (100 ml.) 10% fuming sulfuric acid at room temperature in a 250 ml. three neck flask equipped with a stirrer and thermometer. There is a tendency for the product to form a ball, however, upon heating on a steam bath to 95° C. the gummy material dissolves with stirring. After seven hours of stirring at 90–95° C. the sulfonation mixture is allowed to cool to room temperature and drowned into a kg. mixture of ice and water. After stirring the precipitated mixture for 10–15 minutes the product is filtered on a Buchner funnel and the acid cake washed with 250 ml. ice water.

The wet cake containing the resulting tris(4-amino-3-sulfophenoxymethyl) copper phthalocyanine, of Formula B in Equation V above, weighs 100 g. and can be added directly to a dyebath for dyeing cotton in pleasing turquoise blue shades.

Example 2

A one liter three neck flask equipped with a stirrer, thermometer and a condenser is charged with 0.02 mole of the intermediate product from Example 1(a) as 63 g. wet paste, 400 ml. concentrated hydrochloric acid S.G. 1.189 and 200 ml. water. The mixture is refluxed for 5 hours and after hydrolysis is complete the mixture is cooled to room temperature, filtered and washed acid-free with cold water. The hydrolyzed product has the Formula D in Equation IV above, wherein $n$ is 3. Diazotization of the above product with nitrous acid and coupling with (1) p-(3-methyl-5-oxo-2-pyrazolin-1-yl) benzenesulfonic acid sodium salt gives a green dyestuff substantive to cotton, and with (2) H-acid gives a cotton-substantive pink dyestuff.

Example 3

A 500 ml. three necked flask equipped with a stirrer, thermometer and hydrogen chloride fume trap is charged with 160 ml. chlorosulfonic acid. During 20 minutes 0.043 mole of the product of Example 1(a) is added portionwise to the chlorosulfonic acid at room temperature. Then 32 g. phosphorus pentachloride are gradually added during ½ hour. The temperature is gradually raised to 102° C. in 35 minutes, during which time hydrogen chloride fumes begin to evolve. The temperature is further increased to 125–130° C. during 45 minutes and held at this temperature for 8 hours or until the evolution of hydrogen chloride fumes practically ceases. The reaction mixture is allowed to cool to room temperature and drowned onto 2 liters of ice and water. The precipitated product is filtered on a Buchner funnel and the wet cake added portionwise to a mixture of 2 liters of ice and water and 750 ml. of concentrated ammonia (29%). The mixture is stirred overnight, during which time it is allowed to warm to room temperature. The mixture is treated with 375 g. sodium chloride and heated to 82° C. for several hours for agglomeration of the particles to improve the filter form. The copper phthalocyanine derivative is filtered after cooling the mixture to room temperature. The wet cake, weighing 390 g., has the Formula E in Equation VII above.

When the above product is diazotized and coupled with p-(3-methyl-5-oxo-2-pyrazolin-1-yl) benzenesulfonic acid, a direct dyestuff is obtained yielding on cotton bright green dyeings of excellent lightfastness.

Use of the appropriate sulfonated or unsulfonated chloromethylated phthalocyanine precursor, nuclearly substituted p-hydroxyacylanilide, and/or organic amine reactant in the above described procedures yields products of the invention of Formula VIII containing substituents indicated in the table below.

VIII

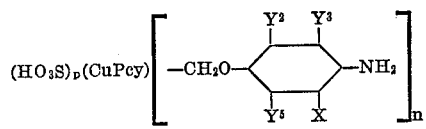

TABLE

| Ex. | P | Y² | Y³ | Y⁵ | X | n |
|---|---|---|---|---|---|---|
| 4 | 1 | C₂H₅ | H | H | SO₂NHC₆H₅ | 1 |
| 5 | 0 | H | CH₃ | H | SO₃H | 4 |
| 6 | 0 | H | Phenyl | H | SO₂NH (sulfophenyl) | 2 |
| 7 | 1 | H | phenoxy | H | SO₂N(CH₃)₂ | 2 |
| 8 | 1 | H | OCH₃ | CH₃ | SO₂NH (phenyl) | 3 |
| 9 | 0 | H | H | H | SO₂N(CH₂—CH₂)₂O | 2 |
| 10 | 1 | H | H | CH₃ | SO₂N(CO—CH₂)(CH₂—CH₂) | 3 |

This invention has been disclosed with respect to certain preferred embodiments, and there will become obvious to persons of ordinary skill in the art various modifications and variations thereof which are intended to be included within the spirit and purview of this invention and application and the scope of the appended claims.

We claim:

1. A compound of the formula

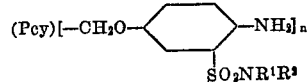

wherein

Pcy represents an unsubstituted or nuclearly lower alkyl-, chloro-, bromo-, phenyl-, sulfonic-, corboxylic-, or sulfamyl-substituted metal or unmetallized phthalocyanine radical, R¹ and R² represent H, phenyl or lower alkyl or, together with the N atom, the atoms necessary to complete a piperidinyl, piperazinyl, pyrazolyl, morpholinyl, pyrrolyl, or 2-pyrrolidonyl heterocycle, and $n$ has an average value of 1 to 4.

2. A compound as defined in claim 1 wherein Pcy represents copper phthalocyanine.

3. A compound as defined in claim 2 wherein R¹ and R² each represents H.

4. A method of producing a compound of the formula

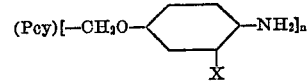

wherein

Pcy represents an unsubstituted or nuclearly lower alkyl-, chloro-, bromo-, phenyl-, sulfonic-, carboxylic-, or sulfamyl-substituted metal or unmetallized phthalocyanine radical, X represents —H, —SO₃H or —SO₂NR¹R², R¹ and R² represent H, aryl or lower alkyl or, together with the N atom, the atoms necessary to complete a piperidinyl, piperazinyl, pyrazolyl, morpholinyl, pyrrolyl, or 2-pyrrolidonyl heterocycle, and $n$ has an average value of 1 to 4 comprising reacting by heating at a temperature of about 60 to 100°C., an unsubstituted or nuclearly lower alkyl-, chloro-, bromo-, phenyl-, sulfonic-, carboxylic-, or sulfamyl-substituted metal or unmetallized phthalocyanine compound containing an average of 1 to 4 nuclearly substituted chloromethyl groups per molecule with, for each mole of said compound, 1 to 4 moles of a p-hydroxyacylanilide of the formula

wherein Ac represents alkanoyl of 1 to 4 carbon atoms, in the presence of an alkali metal pyrrolidinone and N-methyl-pyrrolidinone, and then treating the resulting intermediate in an acidic medium to hydrolyze the acylamino group to —NH₂, said acid medium being concentrated sulfuric acid or oleum when a product wherein X is —SO₃H is desired, and said acidic medium being chlorosulfonic acid and the resulting product is further reacted with a compound of the formula HNR¹R² when a product is desired wherein X is —SO₂ NR¹R².

5. A method as defined in claim 4 wherein Pcy and said phthalocyanine compound is copper phthalocyanine.

6. A method as defined in claim 5 wherein said p-hydroxyacylanilide is 4-hydroxyacetanilide.

7. A method as defined in claim 6 wherein said acidic medium is oleum whereby a product is produced wherein X is —SO₃H.

8. A method as defined in claim 6 wherein said acidic medium is hydrochloric acid whereby a product is produced wherein X is —H.

9. A method as defined in claim 6 wherein said acidic medium is chlorosulfonic acid and the resulting product is further reacted with ammonia whereby a product is produced wherein X is —SO$_2$NH$_2$.

10. A compound of the formula

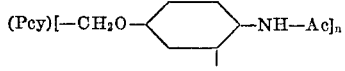

wherein

Pcy represents an unsubstituted or nuclearly lower alkyl-, chloro-, bromo-, phenyl-, sulfonic-, carboxylic-, or sulfamyl-substituted metal or unmetallized phthalocyanine radical, Ac represents alkanoyl of 1 to 4 carbon atoms, and $n$ has an average value of 1 to 4.

References Cited

UNITED STATES PATENTS

| 3,136,777 | 6/1964 | Tobel | 260—314.5 |
| 3,133,059 | 5/1964 | Clerke et al. | 260—242 |

FOREIGN PATENTS

| 589,118 | 6/1947 | Great Britain. |

JOHN D. RANDOLPH, *Primary Examiner.*

WALTER A. MODANCE, *Examiner.*

H. I. MOATZ, *Assistant Examiner.*